Oct. 22, 1957  A. R. BLACKBURN ET AL  2,810,234
PLANT RECEPTACLE WITH PROVISION FOR VENTILATING OPENINGS
Filed Nov. 24, 1954
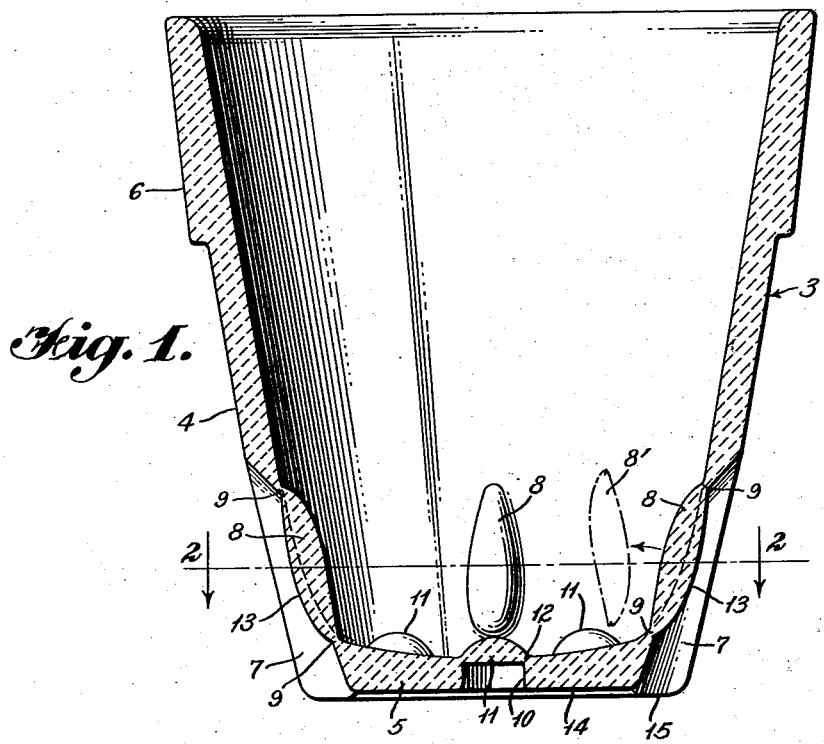
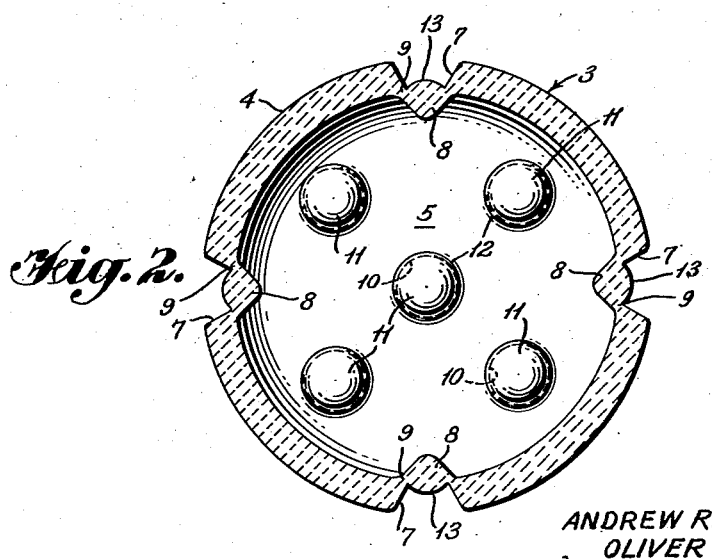
INVENTORS
ANDREW R. BLACKBURN,
OLIVER M. TUCKER
and RICHARD E. STEELE.
BY
ATTORNEYS

United States Patent Office 2,810,234
Patented Oct. 22, 1957

2,810,234

PLANT RECEPTACLE WITH PROVISION FOR VENTILATING OPENINGS

Andrew R. Blackburn, Westerville, and Oliver M. Tucker and Richard E. Steele, Worthington, Ohio, assignors to Ram Incorporated, Columbus, Ohio, a corporation of Michigan Application November 24, 1954, Serial No. 471,049

4 Claims. (Cl. 47—34)

The present invention relates to improvements in plant receptacles such as flower pots. The invention is more particularly concerned with an improved plant receptacle in which provision is made for providing, at the will of the user, one or more ventilating openings in the side wall of the receptacle.

Some types of plants during at least some stages of growth require ventilation or air circulation through the soil within the plant receptacle. The orchid plant is an example of plants of this type. Some suggestions have heretofore been made to cut a slot or slots in the wall of the plant receptacle either before or after firing the ceramic material of which the receptacle is made. While these suggestions provide receptacles which permit ventilation of the soil and plant roots within the receptacles, such receptacles allow the user no selection or control of the extent of ventilation or aeration. Such receptacles have the further disadvantage that they are unsightly.

One of the primary objects of the present invention is to provide a plant receptacle in which provision is made for the user to make any desired number of ventilating openings in the side wall of the receptacle to thereby select the extent of aeration of the soil and plant roots within the receptacle.

Another important object of the present invention is to provide a plant receptacle which is attractive in appearance both before and after being provided with ventilating openings in the side wall thereof.

Another object of the invention is to provide a plant receptacle having portions of the side wall thereof integrally connected to the receptacle by thin web portions which are readily fracturable at the will of the user to provide the desired number of ventilating openings in the side wall of the receptacle.

Another object of the invention is to provide readily separable portions in the side wall of a plant receptacle, the separable portions being so arranged as to reduce the likelihood of their being unintentionally removed during handling or shipping of the receptacle, even though a number of such receptacles may be stacked in nested relation.

Still another object of the invention is to provide a flower receptacle in which one or more ventilating openings may be made in the side wall thereof without unduly disturbing the soil or plant roots within the receptacle.

The foregoing and other objects and advantages of the invention will be better understood from the following description which has reference to the accompanying drawing, wherein:

Figure 1 is a vertical sectional view of a plant receptacle embodying the invention; and Figure 2 is a horizontal sectional view taken in the direction of the arrows along the line 2—2 of Figure 1.

The plant receptacle is designated generally by the reference numeral 3 and comprises a frusto-conical side wall 4 and a bottom wall 5. The side wall 4 may be provided with an integral collar portion 6. The lower portion of the side wall 4 is provided with a plurality of flute-like channels 7. Four such channels are shown in the drawing, although a greater or lesser number may be provided. Generally kernel-shaped portions 8 of the side wall 4 are offset inwardly of the receptacle in such manner that their inner surfaces project into the interior of the receptacle and their outer surfaces project into the channels 7. The inwardly offset portions 8 are integrally connected to the side wall 4 by web portions 9 which are of substantially lesser thickness than other portions of the side wall 4 and also of substantially lesser thickness than the kernel-shaped portions 8.

The plant receptacle may be manufactured in the form described above. In such form the side wall 4 of the receptacle 3 has no openings therein and the receptacle can be used in that form for growing plants which require no aeration. When it is desired to aerate the soil and plant roots within the receptacle, one or more of the inwardly offset portions 8 can be pushed or tapped inwardly with sufficient force to fracture the web portions 9. One of the thus separated portions 8 is illustrated in Figure 1 of the drawing by dot-dash lines and is designated by the reference numeral 8'. The grower can in this manner provide one or more ventilating openings in the side wall 4 of the receptacle. Some plants may require limited aeration during early stages of development and maximum aeration at later stages and it is thus possible for the grower to periodically increase the extent of aeration by periodically pushing or tapping one of the portions 8 into the receptacle. The portions 8 may be thus forced inwardly even though the receptacle is filled with soil, and the soil and plant roots will not be unduly disturbed.

The web portions 9 will fracture cleanly and leave kernel-shaped openings within the flute-like channels 7. It is found that the appearance of the receptacle is not adversely affected by the existence of such openings.

The bottom wall 5 of the receptacle 3 may be provided with a preformed drainage opening therein or may be provided with a plurality of recesses 10 which are covered by caps 11 which are integrally connected to the bottom wall 5 by means of readily fracturable web portions 12.

The outer surfaces 13 of the inwardly offset portions 8 preferably lie within the flute-like channels 7 and are thus protected to a large extent from engagement with objects outside the receptacle 3. The likelihood of unintentional separation of the inwardly offset portions 8 is thus minimized. The vertical height of the collar portion 6 is preferably such that one receptacle can be partially nested within another without the bottom of a nested receptacle striking the inner surfaces of the inwardly offset portions 8. This permits the receptacles to be nested for shipment and eliminates danger of the inwardly offset portions 8 being unintentionally separated or fractured away from the side walls 4.

The receptacle 3 is preferably formed of ceramic material such as baked clay.

The lower surface 14 of the bottom wall 5 is preferably elevated slightly above the lower end 15 of the side wall 4. The flute-like channels 7 preferably extend to the bottom of the side wall 4. This arrangement permits circulation of air through the lower ends of the channels 7 and beneath the bottom wall 5 so that the air can enter the bottom opening when the cap 12 has been removed. This arrangement also permits water which may seep through the opening in the bottom wall to flow outwardly from beneath the bottom of the receptacle.

It will be seen from the foregoing that there is provided a receptacle which has the advantages and which achieves the objectives enumerated above. The form of the invention which has been illustrated and described is the form which is presently preferred, but it will be understood that various alternations may be made without departing from the broader scope of the invention as defined by the following claims.

What is claimed is:

1. A plant receptacle of ceramic material having a flute-like channel in the side wall thereof, a portion of the wall within the channel being offset inwardly of the receptacle, the inwardly offset portion being surrounded by and integrally connected to said wall by a web portion of substantially lesser thickness than said offset portion of said wall, said web portion being readily fracturable to provide a ventilating opening through said wall within said channel.

2. A plant receptacle of ceramic material having in the side wall thereof a plurality of flute-like channels, a portion of said wall within each channel being of substantially lesser thickness than other portions of said wall, the portion of lesser wall thickness within each channel defining the outline of a geometric figure, the body of said geometric figure being offset inwardly of the receptacle, said portions of lesser wall thickness being readily fracturable to provide ventilating openings through said wall within said channels.

3. A plant receptacle of ceramic material having a portion of the side wall thereof offset radially inwardly of the receptacle, the offset portion being surrounded by and connected to said wall by an integral web portion of substantially lesser thickness than the thickness of said offset portion of said wall, said web portion being readily fracturable to provide a ventilating opening through the side wall of the receptacle.

4. A plant receptacle of ceramic material having integral portions of the side wall thereof offset inwardly of the receptacle and surrounded by and connected to said side wall by integral web portions of substantially lesser thickness than said integral portions and other portions of said wall, said web portions being readily fracturable to provide ventilating openings through the side wall of the receptacle.

References Cited in the file of this patent

UNITED STATES PATENTS

| | | |
|---|---|---|
| 758,678 | Muller | May 3, 1904 |
| 954,440 | Klemm | Apr. 12, 1910 |
| 2,484,909 | Ritter | Oct. 18, 1949 |
| 2,514,269 | Wilberschied | July 4, 1950 |